(12) United States Patent
Pappalardo et al.

(10) Patent No.: US 6,862,584 B2
(45) Date of Patent: Mar. 1, 2005

(54) LOGICAL FUZZY UNION AND INTERSECTION OPERATION CALCULATION CIRCUIT

(75) Inventors: Francesco Pappalardo, Paternò (IT); Biagio Giacalone, Trapani (IT); Francesco Mammoliti, Dasà (IT); Edmondo Gangi, Canalicchio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 558 days.

(21) Appl. No.: 09/727,297

(22) Filed: Nov. 29, 2000

(65) Prior Publication Data

US 2001/0039538 A1 Nov. 8, 2001

(30) Foreign Application Priority Data

Nov. 30, 1999 (IT) .......................................... TO99A1056

(51) Int. Cl.$^7$ ............................. G06F 15/18; G06G 7/00
(52) U.S. Cl. ............................ 706/8; 706/908; 706/916
(58) Field of Search ................................ 706/1, 6, 4, 8, 706/9

(56) References Cited

U.S. PATENT DOCUMENTS

| | | | | | |
|---|---|---|---|---|---|
| 5,335,314 A | * | 8/1994 | Tsutsumi et al. | ............... | 706/1 |
| 5,343,553 A | * | 8/1994 | Miyazawa et al. | ............. | 706/4 |
| 5,398,299 A | | 3/1995 | Ota et al. | ....................... | 395/3 |
| 5,615,303 A | * | 3/1997 | Abruzzese et al. | ............. | 706/4 |
| 5,710,867 A | * | 1/1998 | Giacalone et al. | ............. | 706/1 |
| 5,796,917 A | * | 8/1998 | Matranga et al. | .............. | 706/4 |
| 5,875,438 A | * | 2/1999 | Pappalardo et al. | ........... | 706/3 |
| 6,075,338 A | * | 6/2000 | Mazza et al. | ................ | 318/803 |
| 6,385,598 B1 | * | 5/2002 | Giacalone et al. | ............. | 706/1 |
| 6,424,958 B1 | * | 7/2002 | Pappalardo et al. | ........... | 706/8 |

OTHER PUBLICATIONS

Giacalone et al; Hardware implementation versus software emulation of fuzzy algorithms in real applications; The IEEE International Conference on Fuzzy Systems Proceedings; vol. 1; May 4–9, 1998; pp 7–12.*

Gabrielli et al; Design and preliminary results of high speed analog 1.0 μm CMOS MIN–MAX circuit for fuzzy architectures; Proceedings of the 38th Midwest Symposium on Circuits and Systems; vol. 1; Aug. 13–16, 1995; pp 381–384.*

Hung et al; Implementing a fuzzy inference engine using FPGA; Sixth Annual IEEE International ASIC Conference and Exhibit Proceedings; Sep. 27–Oct. 1, 1993; pp 349–352.*

Kartika; FPGA Application As Irrigation Controller With Fuzzy Logic Methode; www.tec.puv.fi/~smv/ED1/PROJECT/xs_fuzzy.pdf.*

Watanabe et al., "Evaluation of Min/Max Instructions for Fuzzy Information Processing," *IEEE Transactions On Fuzzy Systems* 4(3):369–374, 1996.

Watanabe, H., et al., "Evaluation of Min/Max Instruction for Fuzzy Information Processing,"IEEE Transactions On Fuzzy Systems, 4(3):369–374, Aug. 1996.

* cited by examiner

*Primary Examiner*—Anthony Knight
*Assistant Examiner*—Meltin Bell
(74) *Attorney, Agent, or Firm*—Lisa K. Jorgenson; Robert Iannucci; Seed IP Law Group PLLC

(57) ABSTRACT

The calculation circuit comprises a subtracter having a first and a second input receiving a first and, respectively, a second input datum; a first output supplying a first output datum equal to the difference between the first and the second input datum; and a second output supplying a sign flag indicating the sign of the first output datum; an XOR logic gate having a first input receiving the sign flag, a second input receiving a first logic selection signal assuming a first level for the selection of the logical fuzzy union operation and a second level for the selection of the logical fuzzy intersection operation, and an output supplying a second logic selection signal; and a multiplexer having a first and a second datum input receiving the first and, respectively, the second input datum; a selection input receiving the second selection signal; and an output supplying a second output datum constituted by the first or the second input datum (A, B) as a function of the level assumed by the second selection signal.

17 Claims, 1 Drawing Sheet

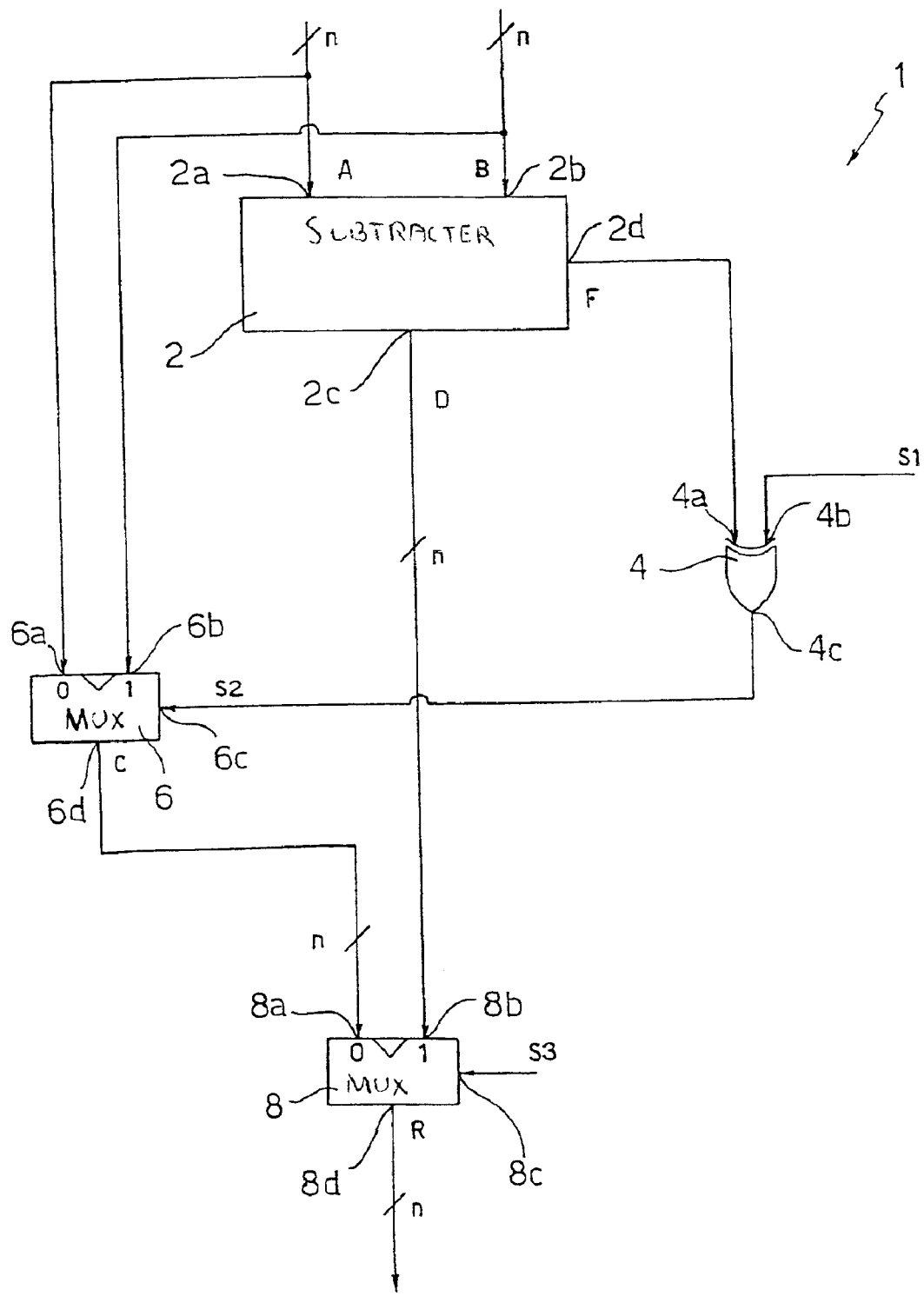

LOGICAL FUZZY UNION AND INTERSECTION OPERATION CALCULATION CIRCUIT

TECHNICAL FIELD

The invention relates to a logical fuzzy union and intersection operation calculation circuit.

BACKGROUND OF THE INVENTION

As is known, in fuzzy logic the implementation of the so-called inference rules requires the performance of logical intersection and union operations of two or more data constituted by the values assumed by the quantities taken into consideration by the inference rules, wherein the union operation requires the greatest of the data to be determined while the intersection operation requires the smallest of said data to be determined.

At the present time, in the majority of systems operating with fuzzy logic, the logical fuzzy union and intersection operations are carried out either using dedicated calculation circuits or mixed calculation circuits capable of calculating both non-fuzzy and fuzzy rules, but still using calculation circuits dedicated to calculating intersection and union operations.

SUMMARY OF THE INVENTION

An embodiment of the present invention provides a logical fuzzy union and intersection operation calculation circuit which is simple and which uses a traditional architecture generally dedicated to the calculation of arithmetic/logical operations.

The calculation circuit includes a subtracter, a comparator, and a first data selector. The subtracter has a first and a second input receiving a first and a second input datum, respectively; a first output supplying a first output datum correlated to the difference between the first and second input datum; and a second output supplying a sign flag indicating the sign of the first output datum. The comparator has a first input receiving the sign flag, a second input receiving a first selection signal assuming a first level for the selection of the logical fuzzy union operation and a second level for the selection of the logical fuzzy intersection operation; and an output supplying a second selection signal assuming a first level when the sign flag and the first selection signal comply with a pre-determined relation and a second level when the sign flag and the first selection signal do not comply with the pre-determined relation. The first data selector has a first and a second datum input receiving the first and the second input datum, respectively; a selection input connected to the output of the comparison means and receiving the second selection signal; and an output supplying a second output datum correlated to one of the first and second input data as a function of the level of the second selection signal.

The calculation circuit also may include a second data selector having a first and a second datum input connected to the output of the first data selector and, respectively, to the first output of the subtracter and receiving the first and the second output datum, respectively; a selection input; and an output. The selection input receives a third selection signal assuming a first level for the selection of an operating mode in fuzzy logic and a second level for the selection of an operating mode in non-fuzzy logic. The output supplies a third output datum correlated to one of the first and second output datum as a function of the level of the third selection signal.

BRIEF DESCRIPTION OF THE DRAWINGS

For a better understanding of the invention a preferred embodiment will now be described, purely by way of non-exhaustive example and with reference to the accompanying drawing, which shows a calculation circuit for performing logical fuzzy union and intersection operations according to the invention.

DETAILED DESCRIPTION OF THE INVENTION

As shown in the accompanying drawing, the calculation circuit, indicated as a whole by 1, comprises a subtracter 2 having a first and a second input 2a, 2b receiving a first and, respectively, a second input datum A, B having a binary representation and each formed by n bits, a first output 2c supplying a first output datum D, having a binary representation and formed by n bits, equal to the binary difference between the first and the second input datum A, B, i.e., D=A−B, and a second output 2d supplying a sign flag F, having a binary representation and formed by a single bit, representative of the sign of the first output datum D, for example F=0 if A≦B and F=1 if A<B.

The calculation circuit 1 further comprises an XOR logic gate 4 having a first input 4a connected to the second output 2d of the subtracter 2 and receiving the sign flag F, a second input 4b receiving a first logic selection signal S1 and an output 4c supplying a second logic selection signal S2 obtained by performing the EXCLUSIVE OR (or identity check) operation between the sign flag F and the level of the first selection signal S1, according to the known equation $S2=F\cdot\overline{S1}+\overline{F}\cdot S1$.

In particular, the first selection signal S1 assumes a first logic level, a low logic level for example, when the calculation circuit 1 is desired to perform the logical fuzzy union operation and a second logic level, a high logic level in the example in question, when the calculation circuit 1 is desired to perform the logical fuzzy intersection operation, while the second selection signal S2 assumes, in the example in question, a low logic level when the sign flag F and the first selection signal assume equal logic values while it assumes a high logic level when the sign flag F and the first selection signal assume different logic values.

The calculation circuit 1 further comprises a first multiplexer 6 having a first and a second datum input 6a, 6b receiving the first and, respectively, the second input datum A, B, a selection input 6c connected to the output 4c of the XOR logic gate 4 and receiving the second selection signal S2, and an output 6d supplying a second output datum C constituted by the first input datum A when the second selection signal S2 assumes a first logic level, a low logic level for example, and by the second input datum B when the second selection signal S2 assumes a second logic level, a high logic level in the example in question.

Finally the calculation circuit 1 comprises a second multiplexer 8 having a first datum input 8a connected to the output 6d of the first multiplexer 6 and receiving the second output datum C, a second datum input 8b connected to the output 2c of the subtracter 2 and receiving the first output datum D, a selection input 8c receiving a third logic selection signal S3 and an output 8d supplying a third output datum R constituted by the second output datum C present at the output of the first multiplexer 6 when the third selection signal S3 assumes a first logic level, a low logic level for example, and by the first output datum D present at the output of the subtracter 2 when the third selection signal S3 assumes a second logic level, a high logic level in the example in question.

In particular, the third selection signal S3 assumes a first logic level, a low logic level for example, when it is desired to operate in fuzzy logic, i.e., when the calculation circuit 1 is desired to perform the logical fuzzy union and intersection operations, and a second logic level, a high logic level in the example in question, when it is desired to operate in conventional binary logic, i.e., when the calculation circuit 1 is desired to perform the logical operation of conventional binary subtraction.

The calculation circuit 1 operates as follows.

When the third selection signal S3 assumes a high logic level, the output 8d of the second multiplexer 8 is connected to the second data input 8b of said second multiplexer 8, at which there is present the first output datum D equal to the difference between the input data A and B and supplied by the subtracter 2. In this condition the calculation circuit 1 thus operates as a subtracter circuit performing a subtraction operation in conventional binary logic.

When the third selection signal S3 assumes a low logic level, the output 8d of the second multiplexer 8 is connected to the first data input 8a of the second multiplexer 8 at which there is present either the first or the second input datum A or B, which, depending on the logic level of the second selection signal S2, is present in its turn at the output 6d of the first multiplexer 6. In this condition, therefore, the calculation circuit 1 operates as a circuit for selecting the greater or the lesser of the two input data A and B and hence as a circuit for calculating logical fuzzy union and intersection operations.

In particular, when the first selection signal S1 assumes a low logic level, then the calculation circuit 1 performs the fuzzy union operation, whereas when the first selection signal S1 assumes a high logic level, the calculation circuit 1 performs the fuzzy intersection operation.

In fact, when the first selection signal S1 assumes a low logic level, if the sign flag F assumes the logic value "0", indicating that the first input datum A is greater than the second input datum B, then the second selection signal S2 assumes a low logic value and hence the output 6d of the first multiplexer 6 is connected to the first datum input 6a of the first multiplexer 6 at which precisely the first input datum A is present, whereas if the sign flag F assumes the logic value "1", indicating that the second input datum B is greater than the first input datum A, then the second selection signal S2 assumes a high logic value and hence the output 6d of the first multiplexer 6 is connected to the second datum input 6b of said first multiplexer 6 at which precisely the second input datum B is present.

Therefore, in the present calculation circuit 1 the greater and the lesser of the two data A and B is determined by performing a subtraction operation by means of the subtracter 2, an identity check operation performed, by means of the XOR logic gate 4, between the sign of the result D of the subtraction operation and the logic level of the first selection signal S1 and a selection operation performed, by means of the first multiplexer 6, between the two input data A and B as a function of the result of the identity check operation represented by the second selection signal S2 just supplied at the output of the XOR logic gate.

An examination of the features of the calculation circuit 1 will reveal the advantages it is able to provide.

In particular, the present calculation circuit 1 has an extremely simple architecture formed by components (a subtracter, an XOR logic gate and two multiplexers) generally present in conventional architectures dedicated to the calculation of arithmetic/logical operations and so it may be employed in simple manner in any digital device or in a microcontroller provided with a common arithmetic logic unit (ALU), by making use of the subtracter of the ALU which already exists and simply adding an XOR logic gate and two multiplexers.

Furthermore, because of the extremely simple architecture of the present calculation circuit it is possible to achieve a clear reduction, compared to known calculation circuits, of the number of program instructions required to determine the greater and the lesser of two data and hence a considerable saving of memory space occupied by the program.

Furthermore, in the present calculation circuit the result of a fuzzy union or intersection operation is available at the output after a single clock cycle in that on the one hand, there is no need to perform any type of conditional jump routine or register data reloading routine, operations which are known to require several clock cycles to perform, and on the other hand the only synchronous operation is that of subtraction whereas all the others are asynchronous and so the processing time required to perform them is no longer than a common subtraction operation.

The fact should also be stressed that the calculation circuit 1, as a structure for calculating fuzzy union and intersection operations, also operates without the second multiplexer 8 which is in fact essential in the case in which: a) the calculation circuit 1 is employed on an arithmetic logic unit (ALU) using the subtracter thereof, in this case, in fact, the operation of the subtracter as such must also be ensured; and b) the calculation structure formed by the subtracter 2, the XOR logic gate 4 and the first multiplexer 6 is also desired to be used as a simple subtracter.

Finally it will be clear that modifications and variants may be introduced to the calculation circuit described and illustrated herein without thereby departing from the scope of the present invention.

For example, the logic values assumed by the sign flag F when $A \geq B$ and $A<B$ could be opposite to those described, i.e., they may be F=1 if $A \geq B$ and F=0 if $A<B$, just as the subtracter 2 could perform a subtraction operation opposite to that illustrated, i.e., calculate D=B−A, and also in this case it would be possible for F=1 if $B \geq A$ and F=0 if B<A or F=0 if $B \geq A$ and F=1 if B<A.

In particular, if a subtracter is used which performs the operation D=A−B and outputs a sign flag F where F=1 if $A \geq B$ and F=0 if A<B, then the first selection signal S1 should assume a high logic level when the calculation circuit 1 is desired to perform the logical operation of fuzzy union and a low logic level when the calculation circuit 1 is desired to perform the logical operation of fuzzy intersection.

If a subtracter which performs the operation D=B−A is used, then if the sign flag F supplied is F=1 if $B \geq A$ and F=0 if B<A, then the first selection signal S1 should assume a low logic level when the calculation circuit 1 is desired to perform the logical operation of fuzzy union and a high logic level when the calculation circuit 1 is desired to perform the logical operation of fuzzy intersection, whereas if the sign flag F supplied is F=0 if $B \geq A$ and F=1 if B<A, then the first selection signal S1 should assume a high logic level when the calculation circuit 1 is desired to perform the logical operation of fuzzy union and a low logic level when the calculation circuit 1 is desired to perform the logical operation of fuzzy intersection.

Furthermore, the XOR logic gate could be replaced by an XNOR logic gate, just as the inputs of the two multiplexers 6, 8 could be exchanged; in both cases the logic levels of the first selection signal S1 will have to be modified as a result.

In general therefore, any change in the operation performed by the subtracter 2 and in the logic value assumed by the sign flag F as a function of the relationship existing between the input data A and B and any change made to the inputs of the multiplexers 6, 8 is simply expressed by the re-configuration of the logic values assumed by the first selection signal S1 with no modification of the hardware of the calculation circuit.

Finally, when calculating logical fuzzy union and intersection operations to be performed on three or more data it is sufficient to provide several calculation circuits of the type described above arranged in cascade, in which, apart from the first circuit which performs the calculation on any two of the input data, in the calculation circuits in cascade one of the two data supplied to it at the input is the datum outputted by the preceding calculation circuit.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A calculation circuit for calculating logical fuzzy union and intersection operations, comprising:

subtracter means having a first and a second input receiving a first and, respectively, a second input datum; a first output supplying a first output datum correlated to the difference between said first and second input datum; and a second output supplying a sign flag indicating the sign of said first output datum;

comparison means having a first input receiving said sign flag, a second input receiving a first selection signal assuming a first level for the selection of said logical fuzzy union operation and a second level for the selection of said logical fuzzy intersection operation; and an output supplying a second selection signal assuming a first level when said sign flag and said first selection signal comply with a pm-determined relation and a second level when said sign flag and said first selection signal do not comply with said predetermined relation; and first data selection means having a first and a second datum input receiving said first and, respectively, said second input datum; a selection input connected to said output of said comparison means and receiving said second selection signal; and an output supplying a second output datum correlated to one of said first and second input data as a function of the level of said second selection signal.

2. The calculation circuit according to claim 1, further comprising:

second data selection means having a first and a second datum input connected to said output of said first data selection means and, respectively, to said first output of said subtracter means and receiving said first and, respectively, said second output datum; a selection input receiving a third selection signal assuming a first level for the selection of an operating mode in fuzzy logic and a second level for the selection of an operating mode in non-fuzzy logic; and an output supplying a third output datum correlated to one of said first and second output datum as a function of the level of said third selection signal.

3. The calculation circuit according to claim 2, wherein said second data selection means comprise multiplexer means.

4. The calculation circuit according to claim 1, wherein said comparison means comprise identity detection means generating said second selection signal assuming said first level when said sign flag and said first selection signal are identical to each other and said second level when said sign flag and said first selection signal are different from each other.

5. The calculation circuit according to claim 4, wherein said identity detection means comprise logic gate means.

6. The calculation circuit according to claim 5, wherein said logic gate means comprise an XOR logic gate.

7. The calculation circuit according to claim 1, wherein said first data selection means comprise multiplexer means.

8. A calculation circuit for selectively calculating fuzzy and non-fuzzy logical operations, comprising:

a subtracter having first and second inputs that receive first and second input data, respectively, and first and second outputs, the subtracter being structured to produce at the first output a first output datum equal to the difference between the first and second input data; and produce at the second output a sign flag indicating whether the difference is positive or negative;

a first multiplexer having first and second data inputs, a control input, and an output, the first and second data inputs receiving the first and second input data, respectively; the control input being coupled to the second output of the subtracter, and the first multiplexer being structured to supply at the output of the first multiplexer a one of the first and second input data which is selected depending on the sign flag; and a second multiplexer having a first and a second data inputs, a control input, and an output, the first and second data inputs being coupled to the first output of the subtracter and the output of the first multiplexer, respectively.

9. The calculation circuit of claim 8, further comprising a comparator having first and second inputs and an output, the first input being coupled to the second output of the subtracter, the second input receiving a first selection signal having a first level for selecting a logical fuzzy union operation and a second level for selecting a logical fuzzy intersection operation, the comparator being structured to produce at the output of the comparator a second selection signal assuming a first level when the sign flag and the first selection signal comply with a predetermined relation and a second level when the sign flag and the first selection signal do not comply with the predetermined relation, the output of the comparator being coupled to the control input of the first multiplexer such that the first multiplexer selects one of the first and second input data based on the second selection signal.

10. The calculation circuit of claim 9 wherein the comparator includes an identity detector structured to generate the second selection signal with the first level when the sign flag and the first selection signal are identical to each other and with the second level when the sign flag and the first selection signal are different from each other.

11. The calculation circuit according to claim 10, wherein the identity detector includes an XOR logic gate.

12. A method of performing logical fuzzy union and intersection operations on first and second inputs, the method being practiced on a computer, the method comprising:

determining a difference between the first and second inputs, resulting in a difference value corresponding to the difference and a sign flag indicating a sign of the difference;

comparing the sign flag with a first selection signal having a first value if the fuzzy logical union operation is selected and a second value if the logical fuzzy intersection operation is selected, the comparing resulting in second selection signal having a first level when the sign flag and the first selection signal comply with a predetermined relation and a second level when the sign flag and the first selection signal do not comply with the predetermined relation; and selecting as a first output one of the first and second inputs depending on whether the second selection signal has the first level or the second level.

13. The method of claim 12, further comprising:

receiving a third selection signal that indicates whether a fuzzy logic operation or a non-fuzzy logic operation is selected; and selecting a second output by selecting the first output if the fuzzy logic operation is indicated by the third selection signal and selecting the difference value if the non-fuzzy logic operation is indicated by the third selection signal.

14. The method of claim 13 wherein the step of selecting a second output is performed by a multiplexer.

15. The method of claim 12 wherein the comparing step includes generating the second selection signal at the first level when the sign flag and the first selection signal are identical to each other and at the second level when the sign flag and the first selection signal are different from each other.

16. The method of claim 15 wherein the comparing step is performed by an XOR logic gate.

17. The method of claim 12 wherein the selecting step is performed by a multiplexer.

* * * * *